Jan. 17, 1928.

J. J. GAHAN 1,656,786

MACHINE GUN FIRE DATA FINDER

Filed April 27, 1927

Inventor
John J. Gahan,
Wilkinson & Giusta Attys.

Patented Jan. 17, 1928.

1,656,786

UNITED STATES PATENT OFFICE.

JOHN JOSEPH GAHAN, OF COLUMBUS, GEORGIA.

MACHINE-GUN FIRE-DATA FINDER.

Application filed April 27, 1927. Serial No. 187,024.

The present invention relates to a device for calculating different machine gun firing data, and has for an object to provide a chart with movable members definitely associated therewith, so as to obtain the various data required for training a machine gun on a target at a definite range, and so as to clear troops, obstacles or the like at various distances from the location of the machine gun and which may be disposed at various interval heights.

Another object of the invention is to provide a relatively simple device which may be quickly and easily manipulated to obtain the necessary data for setting the barrel of the machine gun at the required angle, and wherein the angle is indicated in mils on the device and depending upon the height interval between, and range from gun to target.

Another object of the invention is to provide a calculation device of this character with independent trajectory and clearance arms which are adjustable with reference to the body portion of the device and with a mil scale thereon, so that various problems may be quickly set up and indicated or computed by the mechanical adjustment of the arms relatively to each other and to the body portion of the device.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a face view of the machine gun fire-data finder constructed according to the present invention;

Figure 1:
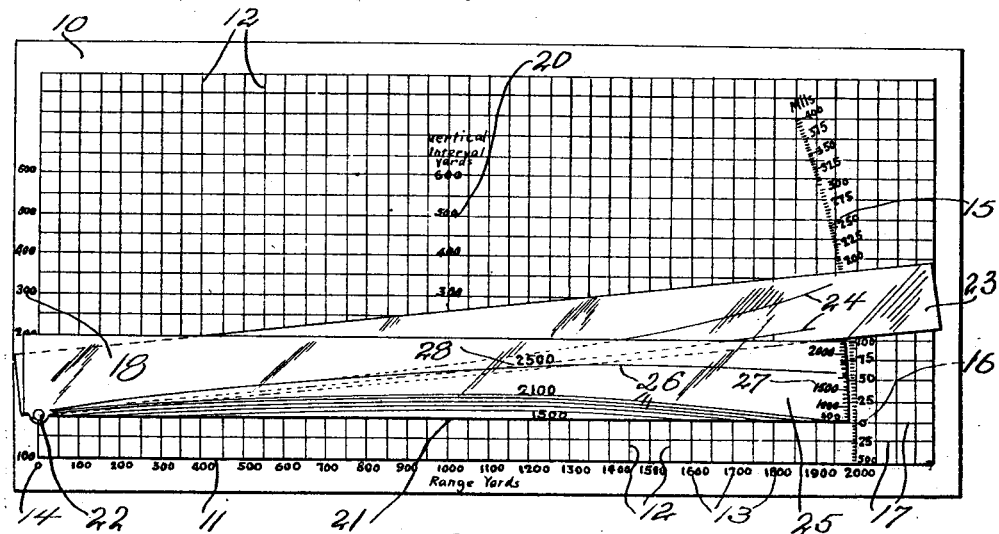
Figure 2:
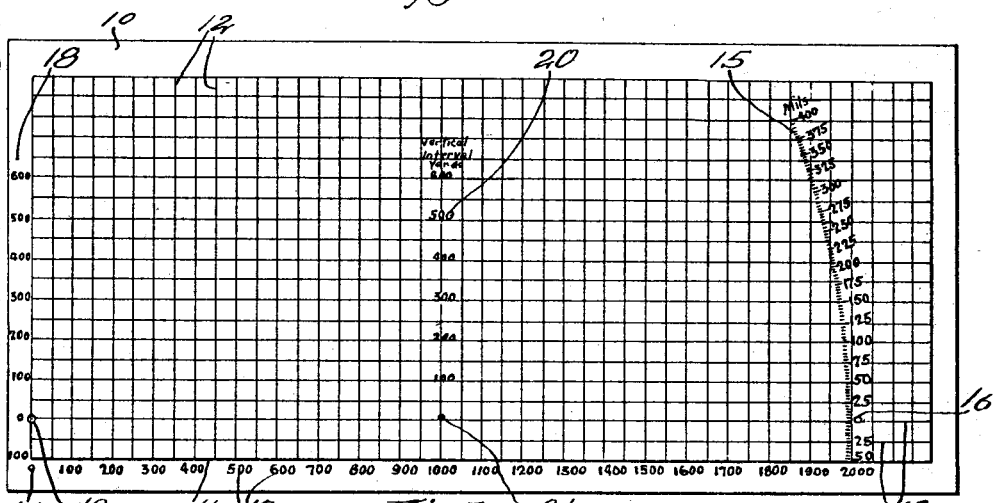
Figure 2 is a detail face view of the body portion thereof.
Figure 3:
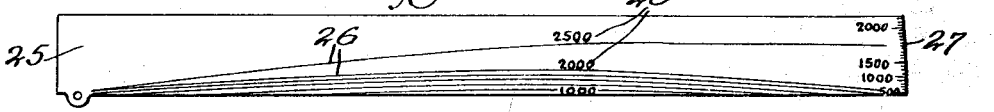
Figure 3 is a detail face view of the trajectory arm employed.
Figure 4:
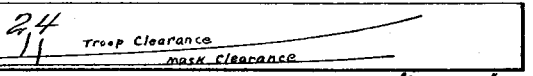
Figure 4 is a like view of the clearance arm which is mounted on the body plate.

Referring to the drawing, 10 designates a body place, which may be of any suitable construction and is preferably in the form of a flat board or slab of composition material or the like, and upon the face of which is depicted or otherwise represented a base line 11 extending substantially throughout the length of the plate 10 and which is provided at suitable spaced points therealong with vertical lines or ordinates 12. The ordinates 12 are preferably equally spaced along the base line 11 and are identified by scale numbers 13 indicating range yards from a zero point 14 at the left lower corner of the plate 10. Toward the right-hand end of the plate 10 is disposed a substantially vertical arcuate line of graduations 15, designating mils and which have a zero point 16 disposed in spaced relation above the base line 11, the scale 15 of mils extending below the zero point 16 for certain calculations. The face of the body plate 10 is also provided with preferably equi-distantly spaced horizontal lines 17, which extend in parallel relation to the base line 11 and which are indicated in yard heights by a height scale 18, which is arranged vertically at the left end of the body plate 10, and which has a zero point 19, which coincides with the horizontal line 17 passing through the zero point 16 of the mils scale 15. At an intermediate portion of the body plate 10 there is disposed a vertical interval scale 20 in yards, corresponding to the scale 18 and which has a zero point 21 on said horizontal line 17 containing the other zero points 16 and 19, so that all calculations may be made above or below said horizontal line 17, which may here be designated as the zero horizontal line.

Mounted on a pivot 22 which coincides with the zero point 19, is a clearance arm 23 of preferably a transparent material and which is provided with substantially radially disposed bottom or base edge, and with clearance lines or curves 24 thereon spaced above the base edge distances which indicate the minimum heights which mean trajectories must have, at certain points so that the entire cone of fire will safely clear troops or masks. The radially disposed bottom edge of the arm 23 extends in a general lengthwise direction and is adapted to be brought into certain relation at different points along its length with the ordinates 12 where they intersect certain horizontal lines 17, according to the known data for calculating or solving a problem. This adjustment shows a predetermined relation between the found point of intersection and the clearance lines 24. This arm 23 extends lengthwise of the body plate 10 and is of such length that it extends beyond the mil scale 15, so that the arm may be manipulated and held in position while the mil scale and other demarcations on the body 10 may be read through the arm 23 with reference to the various lines and curves. The various distances between the bottom edge of the clearance arm 23 and the curve lines 24 is the amount of clearance which has been determined as necessary at any point.

Also mounted on the pivot 22, and superposed upon the clearance arm 23, is a trajectory arm 25, which is also preferably of a transparent nature and which has delineated thereon a desired number of trajectory curves 26 for determining different clearances as will subsequently appear and which is further provided, at its free or right end, with a yard scale 27, which is graduated proportional to the angles of elevation for the ranges indicated by the scale and which is used in determining the angle at which the gun barrel must be set for various given conditions. The several trajectories are distinguished by having their ranges 28 marked near them.

Perhaps the most common use for the device of this invention is to determine the quadrant angles of elevation, or angles at which barrel must be tilted from the horizontal, to strike a target at a known range and height with respect to the gun. This is determined by using only the trajectory arm 25, placing the bottom or base of the arm 25 at the proper intersection, and reading the mils scale 15 opposite the proper range indication on scale 27. In this use the trajectory curves 26 are not used.

Another common use for the device would be the determination of whether, in firing at a given target the cone of fire would clear intervening masks or safely clear intervening troops. For these cases, the clearance arm 23 is moved into position with its base line or bottom edge in proper reference to the intersection of range and vertical interval lines, 17 and 12 respectively, corresponding to the mask. The trajectory arm 25 is now placed so that its bottom edge is at intersection of range and vertical interval lines, 17 and 12 respectively, for target. Then it is noted whether the particular trajectory curve corresponding to the range to target is above or below the clearance line at the location of the mask. If above the clearance line there is sufficient clearance.

The scale 27 on the free or right end of the trajectory arm 25 is marked in yard range distances but which has its graduations disposed relating to the angles of elevation required for those ranges. This scale 27 is used to determine the quadrant angle of elevation required for a given range and given difference in height between gun and target. When the gun and target are at the same level, the quadrant angle of elevation is the same as the angle of elevation and may be read by placing the lower end of scale 27, at zero, on the mil scale 15 and reading the mils opposite range. When gun and target are at different elevations, the quadrant angle of elevation is the sum of the angle of elevation and the angle of site. By placing the bottom of the trajectory arm 25 at the proper intersection, the lower right hand corner of the arm 25 indicates the angle of site and by reading the mils 15 opposite the range on scale 27 the quadrant angle of elevation is found; the device, in effect, adding the angle of site to the angle of elevation.

The device may be used in various ways, such as to adjust the clearance arm 23 on the body plate 10 to dispose the selected clearance curve 24 and place it in proper relations to a certain known point of intersection between an ordinate 12 and a horizontal range line 17, and to subsequently adjust the trajectory arm on the body plate 10 to dispose the proper trajectory curve 26 and place the end of that curve in register with a certain known point of intersection between an ordinate 12 and a horizontal line 17, thus showing the relationship between the trajectory and the clearance limits and thereby indicating whether desired clearance exists.

As a more specific example of some of the uses of the device, to obtain angle of elevation for a given range, place the bottom edge of the trajectory arm 25 on the zero line 17 of the body plate 10 and read opposite the scale mark 27 representing that range on the end of the arm 25. In this instance the clearance arm 23 is not used.

Again, to obtain the angle of site, knowing the range and vertical interval between the gun and target, place the bottom edge of the trajectory arm 25 at the intersection of the horizontal range line 17 and the vertical interval or ordinate line 12, and read opposite the lower-right-hand corner of the trajectory arm 25. To obtain the quadrant angle of elevation, place the lower or bottom edge of trajectory arm 25 on the intersection of range 17 and vertical interval lines 12 and read opposite the mark representing the range on the trajectory arm 25 along the scale 27.

To determine whether cone fire will clear a given mask, set the bottom edge of the clearance arm 23 on the intersection of a range line 17 with the vertical interval of the mask, indicated by a vertical line 12; then without disturbing the arm 23, set the bottom edge of the trajectory arm 25 on the intersection of the known range line 17 and the known vertical interval line 12 to the target. If the mask clearance line 24 is below the trajectory line 26 for the given range to target at the point corresponding to range to mask, the mask will be cleared.

To determine whether the cone fire will clear friendly troops over which it is desired to fire, set the bottom edge of clearance arm 23 on the intersection of the range line 17 with the vertical interval line 12 to the troops. Then, without disturbing the arm 23, set the bottom edge of the trajectory arm 25 on the range 17 and vertical interval line 12 to target. If troop clearance line 24 is below the trajectory line 26, which corresponds to the range to target at the point representing friendly troops, it is safe to fire.

From this it is obvious that the arms 23 and 25 may be adjusted in various positions with respect to the trajectory lines 26 and clearance lines 24, and also with reference to the vertical lines 12 and the horizontal lines 17 to work out and show the conclusion reached by the different problems which heretofore required considerable calculation.

It will be apparent that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A machine gun fire-data finder comprising a body plate having on the face thereof intersecting range and vertical interval lines appropriately designated and provided at one end with a mils scale intersecting said lines, a clearance arm movable over said range and interval intersecting lines, and a trajectory arm movable over said range and interval lines and over said clearance arm and provided with trajectories marked thereon and range scales proportional to the angles of elevation for the ranges and in position to traverse said mils scale.

2. A machine gun fire-data finder comprising a body plate, and a pair of arms pivotally mounted upon said plate, said body plate having upon its face intersecting range and vertical interval indicating lines appropriately designated and having a mils scale intersecting said lines and disposed on an arc concentric to said pivot of the arms, one of said arms having clearance lines thereon and adapted for adjustment with reference to intersecting points on said range and vertical interval lines, and the other pivoted arm having trajectories thereon and adapted to be adjusted on said body plate with reference to intersecting points on said range and vertical interval lines, said second arm having range scale indications proportional to the angles of elevation for the ranges and disposed to traverse said mils scale.

3. A machine gun fire-data finder comprising a body plate having appropriately designated horizontal range lines and vertical interval lines intersecting the range lines, a pair of transparent arms pivotally mounted at a common point upon the body plate, one of said arms having clearance indicating lines thereon and adapted for adjustment with reference to the range and interval lines to show desired clearances on the fire-data finder, the second arm having trajectories marked thereon and adapted for adjustment with respect to the range and interval lines to show upon the fire-data finder whether the appropriate trajectory will clear the points desired on the clearance lines, said second arm having a range scale proportional to the angles of elevation for the ranges, and said body plate having a mils scale concentric with said pivot point and arranged with reference to said range scale on said second arm to indicate the mils of elevation of the machine gun to strike a target at any point.

4. A machine gun fire-data finder comprising a body plate having on the surface thereof appropriately designated range and vertical interval lines disposed in intersecting relation for determining points at various heights and distances from the location of the machine gun, a pair of transparent arms pivotally mounted on the body plate at a zero point with reference to said intersecting lines to indicate the relative position of the gun, said body plate also having an arcuate mils scale disposed in relation to said pivot point of the arms, one of said arms having clearance lines thereon for adjustment over the face of said body plate with reference to the intersections of determined vertical interval and range lines, the second arm having a series of trajectories thereon and a range scale at its free end proportional to the angles of elevation for the ranges, said second arm terminating adjacent the mils scale for traversing the same and said second arm adapted for adjustment with reference to the intersections of determined vertical interval and range lines, said first and second arms adapted for comparison of relation between trajectory curves and clearance curves, said range scale of the second arm adapted to be read with reference to the given range and mils scale adapted to be read with reference to the given range or given range and vertical interval.

JOHN JOSEPH GAHAN.